United States Patent [19]
Carstens et al.

[11] 3,797,405
[45] Mar. 19, 1974

[54] MASS TRANSPORTATION SYSTEM

[75] Inventors: Marion R. Carstens, Atlanta; Homer J. Bates, Roswell, both of Ga.

[73] Assignee: Georgia Tech Research Institute, Atlanta, Ga.

[22] Filed: May 4, 1971

[21] Appl. No.: 140,071

Related U.S. Application Data

[63] Continuation-in-part of Ser. No. 856,566, Sept. 10, 1969, abandoned.

[52] U.S. Cl. ............. 104/155, 104/138 R, 105/365, 243/1, 243/6
[51] Int. Cl. ............................................. B61b 13/12
[58] Field of Search .......... 104/138, 155, 156, 161; 105/365; 243/1, 4, 6; 302/23

[56] References Cited
UNITED STATES PATENTS

| | | | |
|---|---|---|---|
| 1,813,625 | 7/1931 | Knox | 243/6 X |
| 3,285,670 | 11/1966 | Hubbard | 302/23 |
| 714,202 | 11/1902 | Leblanc | 243/1 |
| 3,408,113 | 10/1968 | Bouladon | 243/6 |
| 384,333 | 6–88 | Pitts | 243/1 X |

*Primary Examiner*—Robert G. Sheridan
*Attorney, Agent, or Firm*—Newton, Hopkins & Ormsby

[57] ABSTRACT

A mass transit system for use in moving a load carrying vehicle along a predetermined route between a number of load handling stations. The mass transportation system includes an unobstructed tube transport means located along the predetermined route. A vehicle provided with antifriction support is conveyed through the tube transport means by the momentum of driving air provided by one or more pumping devices which extracts a fraction of the air flow and substantially immediately reintroduces the air into the tube to create or restore the necessary air momentum. The tube may be continuous or non-continuous and is characterized by uniform cross section and the fact that it provides the support for the vehicle. The vehicle is shaped in cross section so as to substantially fill the cross section of the tube but not completely, so as to allow driving air to flow continuously within the tube even though the vehicle may be traveling at a speed substantially less than the mean velocity of the driving air, as on acceleration or deceleration of the vehicle. The vehicle body is also shaped to provide high drag characteristics so that it may travel within the tube at substantially the same velocity as the driving air. Loading and unloading stations are provided in the system in open communication with the ambient atmosphere, thereby allowing ease of loading and unloading. Each of the pumping devices used for delivering the driving air to the tube transport means is positioned between loading and unloading stations and is capable of producing a high mass rate of air flow at very low static pressure and the loading and unloading stations for the vehicle are positioned at points within the tube system where the static pressure is at or near atmospheric pressure.

16 Claims, 12 Drawing Figures

PATENTED MAR 19 1974　　　　　　　　　3,797,405
SHEET 1 OF 3
FIG.1
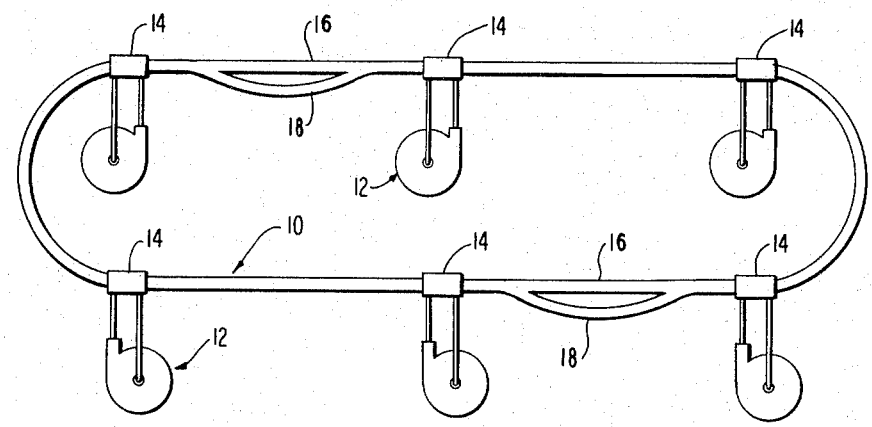
FIG.2
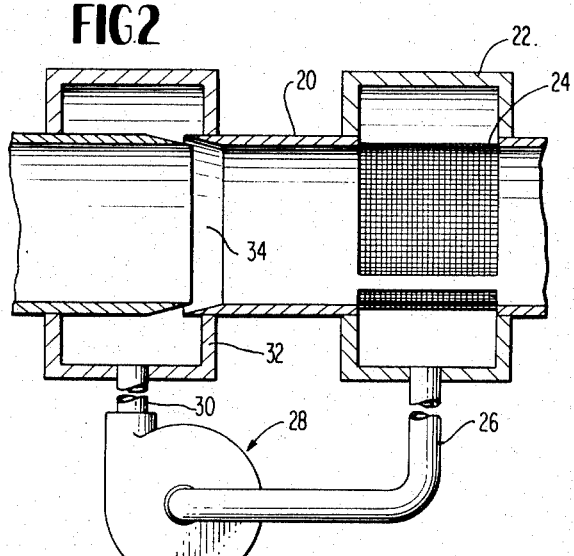
FIG.3
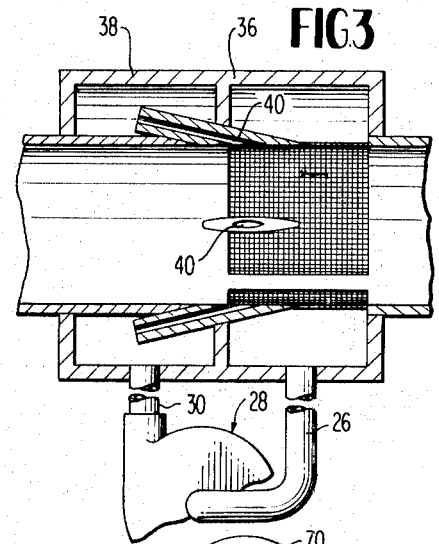
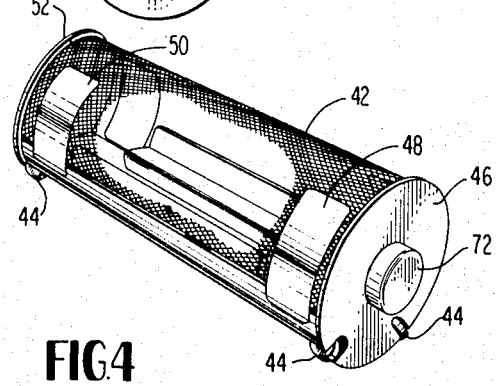
FIG.4
FIG.5
INVENTOR
MARION R. CARSTENS
HOMER J. BATES
BY: Newton, Hopkins, & Ormsby
ATTORNEYS INVENTOR
MARION R. CARSTENS
HOMER J. BATES
BY: Newton, Hopkins, & Ormsby
ATTORNEYS

MASS TRANSPORTATION SYSTEM

CROSS REFERENCE TO RELATED APPLICATIONS

This application is a continuation-in-part of our co-pending application, Ser. No. 856,566, filed Sept. 10, 1969, now abandoned.

BACKGROUND OF THE INVENTION

This invention relates to a pipeline system for moving people or cargo therethrough. More particularly, this invention is directed to a pipeline system for moving a vehicle transport means capable of carrying either cargo or people along a predetermined route between loading and unloading stations.

Pipeline systems have been used for a number of years for conveying or moving fluids such as water, natural gas, and liquid petroleum products from remote areas of source to areas of utilization.

Still other pipeline systems have been devised for conveying material, such as cement, grain and pulverized coal. However, these prior art systems utilized for conveying liquid and particulate material are not adapted for moving people or cargo handling vehicles along a predetermined route.

One of the reasons that people or cargo handling vehicles cannot be used with the present pipeline system arises from the booster pump means which are required at intervals along the pipeline. Conventional booster pump stations utilized for moving fluids or particulate material along a pipeline would smash a passenger-cargo vehicle.

An additional problem presented in using a pipeline system for conveying passenger-cargo vehicles therethrough arises out of the environmental range of the atmosphere in which man is comfortable. The pressure of air surrounding a person must be nearly like that to which he is accustomed and pressure changes experienced in passing through a booster pump must be small in order to avoid discomfort is his ears. If the vehicles are to be unsealed, then the air pressure within the conduit can deviate only slightly from atmospheric pressure. Another environmental limiting factor is the quality of the air within the conduit through which the unsealed vehicle moves. Small tolerance of chemical pollution, such as, carbon monoxide, precludes the burning of chemical fuels within the pipeline.

A number of attempts have been made to provide pipeline systems capable of transporting a cargo carrying vehicle. However, these prior art pipeline systems do not provide loading and unloading stations in open communication with the ambient atmosphere. The prior art pipeline systems utilized complex and expensive means for generating high pressure air flow therethrough and these high pressure pipeline systems do not include means for providing ambient atmosphere loading and unloading stations. Further, the high pressure air flow pipeline systems are extremely expensive to construct and unreliable in operation.

SUMMARY OF THE INVENTION

The above disadvantages of the prior art have been overcome by the present invention which basically includes a tube transport means located along a predetermined route and detailed in dimension to transport one or more vehicles therethrough by means of low pressure air flow. Each vehicle is provided with anti-friction support means and presents a profile to the flow of air which is of high drag characterics and which substantially but not completely fills the cross section of the tube. In this way, the vehicle may be accelerated to a velocity which is close to the mean velocity of the driving air while, at the same time, allowing air to circulate past the vehicle even when the vehicle may be traveling very must slower than the air. In this way, flow of the driving air is maintained so that the driving momentum is maintained through the tube.

It is a feature of the invention that the means for driving the air creates a large mass rate of air flow at very low static pressure. Such means, again in the interest of maintaining air momentum throughout the tube and to avoid large pressure differentials, withdraws but a fraction of the air flow and restores its momentum by reintroducing the air withdrawn at increased velocity.

It is a further feature of the invention to provide vehicle loading and unloading stations open to the atmosphere for ease of loading and unloading. In addition, the air pumping device or devices are positioned with respect to vehicle loading-unloading stations such that these stations are in regions in which their ambient static pressure is at or near atmospheric pressure. Moreover, the loading-unloading stations are provided with means for bypassing or otherwise diverting the driving air, such that the atmosphere at these stations is relatively quiescent.

In one embodiment of the invention, a tube extends between loading-unloading stations and a vehicle is shuttled back and forth therebetween. Air pumping means located between such stations operates to circulate the driving air in either direction while such stations remain at atmospheric pressure, as aforesaid.

In this, as in other embodiments, the low pressure characteristics of a system depending as it does upon the momentum of the flowing air mass, allows the tube to be made of lightweight construction inasmuch as it is not called upon to withstand high internal pressures.

In another embodiment, an endless tube system is provided in which air is circulated by a series of pumping devices which withdraw system air and reintroduce it into the system so as to maintain a predetermined mean velocity of the circulating air without establishing pressure gradients or total pressure differentials which are intolerable to humans. At intermediate regions between adjacent points of air reintroduction, the system may be open to ambient atmosphere so that these points can be advantageously used for cargo or passenger loading or unloading. The momentum of the circulating air maintains it within the endless tube system and the absence of substantial pressure differentials allows the system to be constructed of lightweight form.

A further feature of the invention concerns the air pumping devices which offer no obstructions to the passage of the vehicles therethrough and includes a top withdrawal opening and a closely adjacent top air reintroduction nozzle which directs the reintroduced air generally axially of the tube system. In addition, the pumping devices are sized whereby the velocity of flow through the pumping devices is a fraction of the quantity of flow through the tube.

The loading-unloading portions of the tube are bypassed by diverting conduits so as to allow the air to maintain its continuous circulation when a vehicle is stopped and without requiring the circulating air to sweep past the vehicle to the discomfort of entering and leaving passengers or cargo handlers. Preferably, each loading-unloading portion includes a downhill section to allow rapid acceleration of the vehicle upon starting.

BRIEF DESCRIPTION OF THE DRAWING

FIG. 1 is a schematic view illustrating a mass transit system constructed according to one embodiment of the present invention;

FIG. 2 is an enlarged sectional view illustrating one form of air pumping arrangement;

FIG. 3 shows a modified form of air pumping arrangement;

FIG. 4 is a perspective view of one form of vehicle;

FIG. 5 is an elevational view showing a proposed manner of mounting the tube system;

DESCRIPTION OF THE ILLUSTRATIVE EMBODIMENTS

Figure 6:
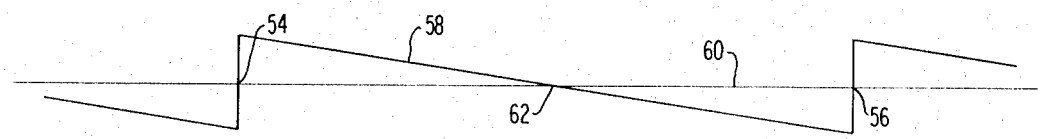
FIG. 6 is a view illustrating the pressure gradients along the tube system.

In the embodiment shown in FIG. 1, an endless tube system is indicated generally by the reference character 10 which will be seen to embody a series of pumping devices 12 having withdrawal and reintroduction regions 14 spaced throughout the length of the tube system. As will be described hereinafter, the pumping devices maintain a circulation of air in one direction within the tube system without imparting any substantial pressure differentials. Instead, the pumping devices 12 are effective to withdraw momentum-deficient system air and reintroduce it as momentum-excess fluid. The tube system embodies a plurality of vehicle loading-unloading portions 16 which are located between sequential withdrawal-reintroduction portions 14 and each such loading-unloading portion 16 has a bypass conduit 18 associated therewith, for a purpose presently apparent.

The main section of the tube through which the vehicles travel and which includes the sections or portions 16 thereof, is of substantially uniform cross-sectional shape throughout and which is only slightly larger than the maximum cross-sectional shape of the vehicles, as hereinafter described.

With reference to FIG. 2, the tube body is indicated by the reference character 20 and for the purpose of system air withdrawal will be seen to be encompassed by an annular manifold 22 within which the tube wall is formed of foraminous or otherwise porous construction as indicated by the reference character 24. The inlet conduit 26 of the pump device 28 is connected to the withdrawal manifold 22 and its outlet conduit 30 is connected to the annular manifold 32 for reintroduction of the system air withdrawn through the manifold 22. In the form of the invention shown in FIG. 2, the reintroduction nozzle is of annular form as indicated by the reference character 34 and its axis is inclined with respect to the axis of the tube 20 to intersect therewith at an angle of about 15°. The particular angle of intersection is not critical, although it is desired that the air be reintroduced in a generally axial fashion within the tube 20 in the direction of vehicle travel. As will appear more clearly hereinafter, the system according to the present invention operates on the principle of maintaining circulation of air and is not dependent upon substantial pressure differentials but is, instead, dependent upon the momentum of the circulating air mass. Thus, the cross-sectional area of the nozzle 34 is very much smaller than the cross-sectional area of the tube 20, i.e. in the order of one-fourth of the tube area. In FIG. 2 the air withdrawal is downstream of the air reintroduction but it is to be understood that this situation may be reversed if desired. However, in any event, it is desirable that the points of withdrawal and reintroduction be closely adjacent to one another so as to minimize any abrupt propelling force on the vehicles involved.

FIG. 3 illustrates a modified form of air withdrawal and reintroduction system and, in the case shown, the withdrawal manifold 36 is immediately adjacent the reintroduction manifold 38; and, in the modification shown, there are a plurality of separate reintroduction nozzles 40 which discharge directly into the region of air withdrawal, substantially as is shown.

Figure 8:
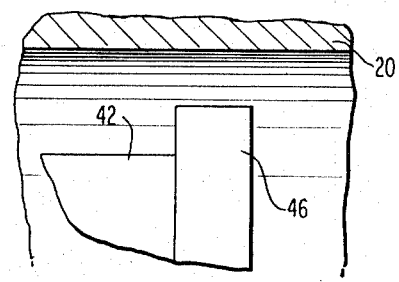
FIG. 8 is a sectional view on enlarged scale illustrating an end plate for the vehicle.

The vehicle adapted to travel in the tube system may be constructed in the fashion indicated in FIG. 4 and may include a body 42 supported by suitable anti-friction means, such as wheels indicated by the reference character 44, so as to produce minimal frictional drag directly upon the tube system; and the front end of the body is provided with a plate 46 which is of a shape similar to the cross-sectional shape of the tube system but which is slightly smaller in area so as to provide a continuous clearance space around the vehicle with respect to the tube, as is illustrated in FIG. 8. The body 42 may be open or provided with entrance and egress doors 48 and 50 and may be internally provided with suitable seating arrangements as illustrated. The rear of the body may be formed by a plate 52 which, like the front plate 46 is flat, the purpose being to provide a vehicle body which is not aerodynamic but which, to the contrary, provides a high drag characteristic so that the vehicle may be swept along substantially at the same velocity as the circulating air within the tube system.

As stated hereinbefore, the system according to the present invention operates on the principle of fluid momentum and does not depend upon substantial pressure differentials to effect movement of the vehicles. This is illustrated in FIG. 6 wherein sequential points of air reintroduction are designated at the points 54 and 56 while the pressure gradient 58 between these points will be seen to cross the atmospheric pressure line indicated by the reference character 60. The total pressure differential at any of the air withdrawal-reintroduction points 54, 56, etc. is very small, say in the order of 0.2 psi for a mean circulating air velocity of 45 m.p.h. so that the pressure rise experienced by the passengers in passing the points 54, 56, etc. is tolerable without requiring the vehicle to be of sealed construction. This allows the vehicle to be made of very light weight form and the minimal pressure differentials utilized within the system allow the tube itself to be made of relatively light weight form. In FIG. 6 the points 62 represent intermediate points between adjacent sections 14 in FIG. 1 and may also represent points open continuously to atmospheric pressure so that whereas the tube system is endless, it is, at the same time, an open system inasmuch as it does not require sealing from outside atmosphere. This allows the loading-unloading sections 18 advantageously to be opened directly to ambient atmosphere at such points 62. The system air will be retained within the system due to its momentum and costly filtering mechanisms or heavy constructions to withstand substantial pressures are not required. The circulating aspect of the invention, on the other hand, allows air conditioning and filtering operations to be performed in an efficacious manner. Furthermore, the construction of the air pumping devices and more particularly of the withdrawal-reintroduction portions thereof which freely pass the vehicles without obstruction or impediment, allows the pumping devices 28 to be located in remote locations, if desired, and with which the filtering and/or air conditioning apparatus may be associated. Thus, the users of the system may be isolated from the noisy components of the system and, as described hereinbefore, the entire structure may be made of extremely light weight materials and techniques such as to allow, as is indicated in FIG. 5, the construction of relatively light weight arches 64 to suspend sections 66 and 68 of the tube system overhead as by cables 70 or the like. Thus, an overhead mass transit system is entirely feasible according to the principles of the present invention since the tube system must withstand only very small pressure differentials and need support only very light weight vehicles.

Figure 7:
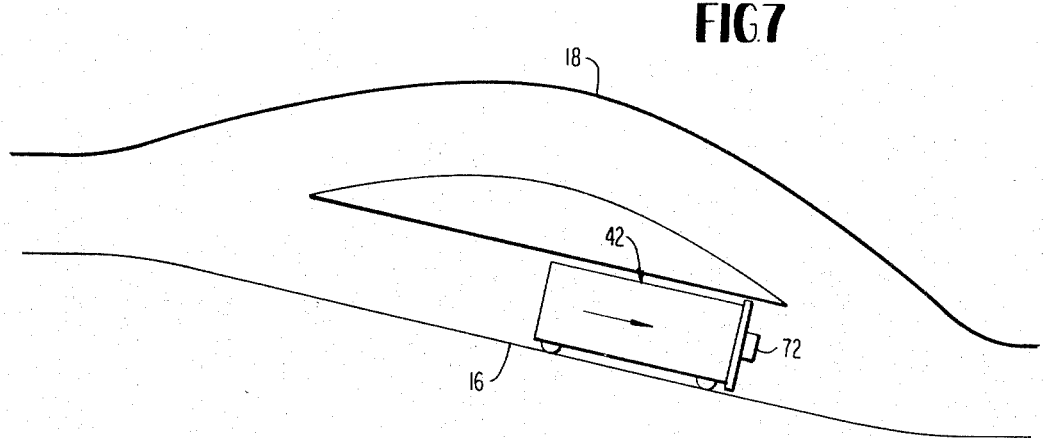
FIG. 7 is a longitudinal section taken through one type of loading-unloading portions.

As is illustrated in FIG. 7, it is preferred that the loading-unloading portions 16 have at least their reentry portions formed of down-hill sections so as to allow the vehicles to accelerate rapidly back into the circulating air stream so as to minimize velocity differentials between the accelerating vehicle and the circulating air stream. The vehicles may be self-contained in that they may be battery operated and provided with generators driven by their wheels to recharge the batteries, which generators may also provide dynamic braking effect in a manner well known in the public transportation art. Additionally, electrically operated disc brakes may be provided and provision for operatorless vehicles may be had by automatically controlling the braking systems of the vehicles. The vehicles may be operated in single or train fashion and may be simply provided with pneumatic bumpers 72 at their forward and rearward ends as indicated in FIG. 4 for the front plate 46. A typical example of a tube diameter would be eight feet with a front plate diameter of 7.75 feet and a body 42 diameter of 7.5 feet. With such an arrangement, it is possible to achieve the constant circulation of system air as described hereinabove even though the vehicle may be moving at an appreciably slower velocity than the circulating air, by virtue of the continuous clearance space provided between the front plate 46 and the tube as shown in FIG. 8. The bypass conduit means 18 is provided to minimize the obstruction within the system when the vehicles are stopped at the loading-unloading sections 16 and to avoid subjecting cargo handlers or the passengers which may be entering or leaving the vehicles to the circulating air stream.

The variation between vehicle speed and system air velocity is minimal even when heavy grades are encountered. Thus, based upon a vehicle weight of 5,000 pounds and an air velocity of 45 m.p.h., the vehicle is capable of climbing a 10 percent grade at a speed of about 41 m.p.h. The reduction in speed for a three-vehicle train under the same conditions would only be about 7 m.p.h.

The system is unique in accommodating maximum vehicle speeds during rush periods while allowing a more efficient but slower speed operation at other times, thus reversing the trend or ordinary bus or automobile transportation For example, a system may be operated at a mean air velocity of 45 m.p.h. during rush periods while consuming roughly twice the power required for normal operation at 35 m.p.h.

Figure 9:
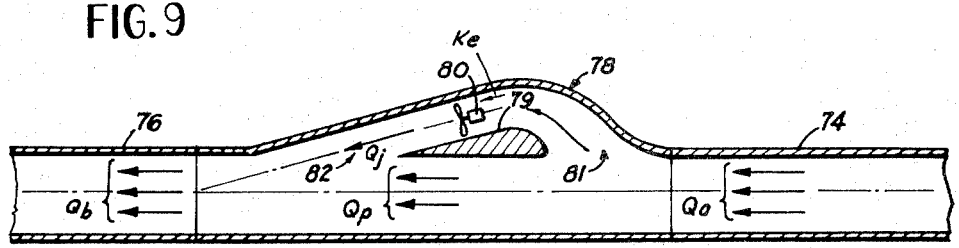
FIG. 9 is a longitudinal section of a modified form of the invention, schematically illustrating air flow therethrough.
Figure 11:
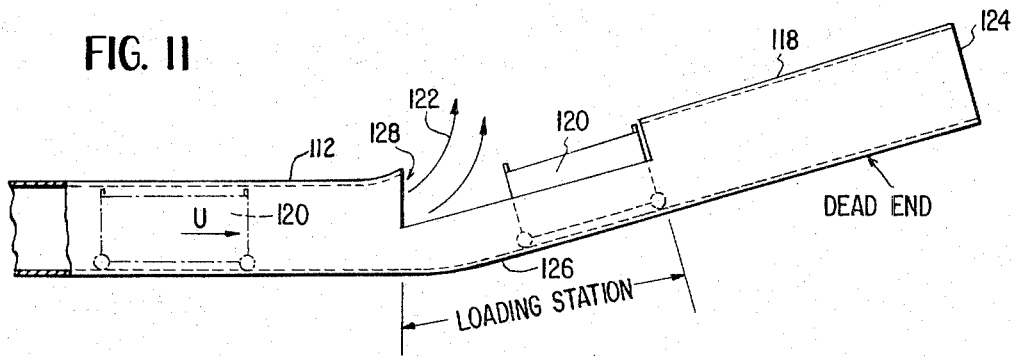
FIG. 11 is a section showing the region of a loading-unloading station used with the embodiments of FIGS. 9 and 10; and, FIG. 12 is a section similar to FIG. 11 but showing a modified form of loading-unloading station.
Figure 12:
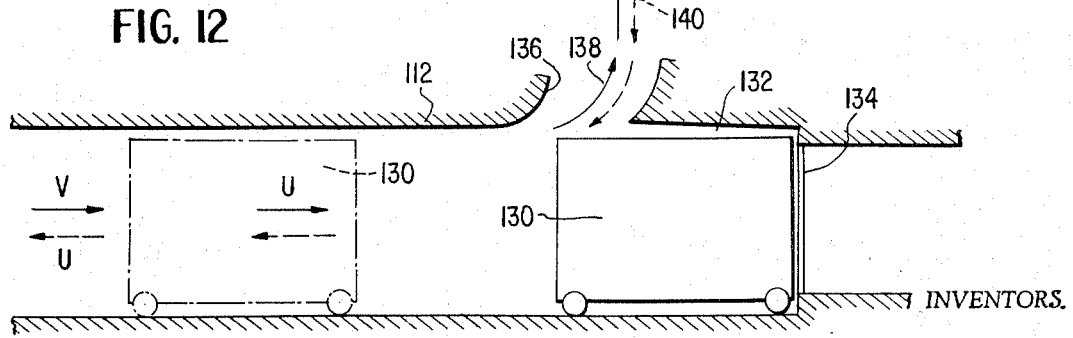

In FIG. 9 a modified form of an air withdrawal and reintroduction system useful in continuous and non-continuous tube systems is shown in which this pumping station is located between two loading-unloading stations, for example only, such as shown in FIGS. 11 and 12. In FIG. 9, the portions 74 and 76 of the tube extend in opposite directions from the pumping station section indicated generally by the reference character 78 and the sections 74 and 76 lead to loading-unloading stations hereinafter described. Pumping station 78 includes an offset conduit means 79 connected in fluid flow communication at axially spaced points to the tube portion 74, 76. Conduit means 79 includes an air pump means 80 located therein. Air pump means 80 is operable for withdrawing a quantity of air from tube portions 74 and re-introducing the quantity of air into tube portions 76. The pumping station 78 could be provided with reversing means, whereby fluid flow can be selectively introduced through the tube system in alternate directions. In addition, it is noted that the pumping station 78 is positioned on top of the conduit and thus does not interfere with the wheels on the vehicle.

In FIG. 9 a schematic illustration of the fluid flow pattern is shown wherein the quantity of fluid moving in tube portion 74 upstream from the pumping station 78 is represented by $Q_a$. The quantity of fluid flowing through downstream portion 76 is represented by $Q_b$ and wherein $Q_a$ is equal to $Q_b$. As shown in FIG 9, $Q_j$ represents the quantity of fluid flow through the pump unit 80 and $Q_b$ represents the quantity of fluid flow through the pipe line at the pump unit. Arrow $K_e$ represents the kinetic energy increase through the pump unit 80, whereas the $K_{ea}$ represents the kinetic energy adjacent the intake of fluid into the pump unit and $K_{eb}$ represents the kinetic energy immediately downstream from the introduction of the fluid jets from the pump station 80. In operation, $K_{eb}$ is greater than $K_{ea}$ due to the kinetic energy increase $K_e$ produced by the pump unit 80. Flow reversal, or vehicle stall occurs when $Q_j$ is greater than $Q_a$. Therefore, design ratio for $Q_a/Q_j$; should be maintained at two or greater. In the particular embodiment shown in FIG. 9, when vehicles are moving from right to left in the tube system, the air pump means 80 is operated and the fractional portion of fluid inducted by the pump means 80, as indicated by the arrow $Q_j$, is re-introduced as indicated by the fluid flow pattern.

In a tube system having one pumping station 78, the pumping station is located between the opposite ends of the tube system preferably midway, providing as mentioned hereinabove, substantially atmosphere static intake and discharge pressure at the respective loading-unloading stations.

Figure 10:
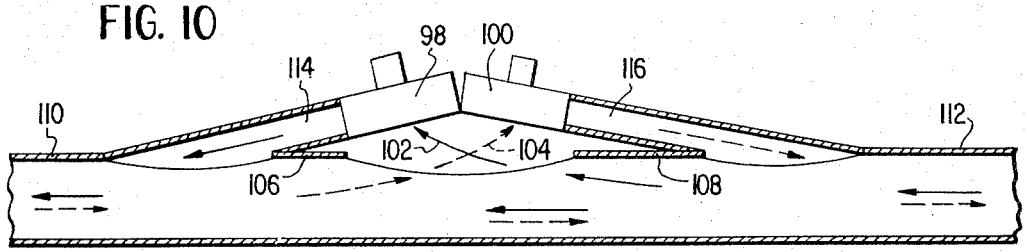
FIG. 10 is a section similar to FIG. 9 but showing a further modification.

FIG. 10 illustrates a modification of FIG. 9 but utilizing two fans 98 and 100 operable for effecting reversal of fluid flow in a tube system. Fans 98 and 100 have a common or respective air inlets for inducting the fractional portions of the air flow as indicated by the reference characters 102 and 104, it being understood that in the case of FIG. 10, only the fan 98 is operated for movement of the vehicles from right to left and the fan 100 is operated only when the vehicles are moving from left to right. The wall sections 106 and 108 may be provided to effect continuations of the uniform diameter wall sections 110 and 112 leading to the loading-unloading stations and respective air channels 114 and 116 are provided to properly direct the discharge air from the respective fans 98 and 100.

For non-continuous systems each loading and unloading station at the opposite ends of the tube system may be constructed in accordance with the showings of FIG. 11 and FIG. 12. In FIG. 11, the station is shown specifically as associated with the embodiment shown in FIG. 10 and is shown to be positioned at the end of the tube section 112. At the end of the tube system as shown in FIG. 11, there is an uphill dead end section 118 which is provided for the purpose of arresting the forward motion of the vehicle 120. The system is open to atmosphere between section 112 and 118 to allow the driving air to be directed away from vehicle 120, as indicated by the reference character 122, and the vehicle, as it approaches the end of section 112, encounters the uphill portion of the system to pass the opening between sections 112 and 118 ultimately to enter the section 118. The section 118 is provided with a dead end wall 124 and the diameter of the station 118 may be slightly larger or smaller than the diameter of section 112 so that the end plates of vehicle 120 will trap air within the dead end section and form a cushion which will, in conjunction with the uphill section, arrest the forward motion of the vehicle 120. An opening may be provided in the wall 124 to allow a predetermined amount of air trapped within the dead end section to escape therefrom in order to ease the stop of the vehicle entering section 118.

After the vehicle has entered and stopped within section 118, the vehicle can then coast back down to the position illustrated in FIG. 11 for loading-unloading of its cargo. For this purpose, a ratchet holder mechanism (not shown) may be located in the floor of the tube system to permit the vehicle to pass into the dead end section 118 but to arrest its motion at the position shown in FIG. 11 when it comes back down the incline. This ratchet mechanism is provided with a selectively retractable feature so as to allow release of the vehicle when it is ready to return to the other end of the tube. Whereupon the vehicle coasts down the incline section 126 leading to the mouth 128 such that the air flow, being reversed, will accelerate the vehicle to the requisite velocity within the section 112 and return it to the loading-unloading section or station at the opposite end of the line.

The fluid represented by reference character 122 which is diverted past vehicle 120 could be re-introduced into a second tube system located adjacent thereto, as indicated hereinabove.

FIG. 12 illustrates a further embodiment of the loading-unloading station to be utilized in conjunction with systems such as are shown in FIGS. 9 and 10. In FIG. 12, the station is again shown in association with the system as illustrated in FIG. 10 and for this purpose, the loading-unloading section is illustrated at the end of tube section 112 of FIG. 10. In the case of FIG. 12, no uphill section is provided but, instead, the moving vehicle 130 is illustrated in dashed lines enters the dead end chamber 132 ultimately coming to rest near the normally closed end wall 134 thereof. The length of the dead end chamber is such as to allow the rear end of the vehicle as shown in solid lines in FIG. 12 to unmask a portion of the air chimney 136 which leads to ambient atmosphere. Again, the fluid flow chimney 136 could be re-introduced into a second tube system located adjacent thereto to be utilized in driving a vehicle through the adjacent tube system. The air flow, consequently can be directed past the rear end of the vehicle 130 and up the chimney as indicated by the arrows 138.

The dead end wall 134 is open and the cargo is unloaded and a fresh cargo loaded into the vehicle 130 whereafter the fan system is reversed in operation so that the air enters downwardly through the chimney as indicated by arrow 140 and impinges against the rear end plate of the vehicle and drags it into the main tube section 112 for return to the opposite end of the tube system.

Thus, one embodiment of the present invention utilizes the continuous tube system wherein the driving air is circulated in a closed path, whereas another embodiment of the invention employes an open-ended tube system. In each of the embodiments of the invention, the loading-unloading stations are open to the ambient atmosphere thereby allowing ease of loading and unloading. Due to the inherent efficiency of the basic system wherein a high mass rate of driving air flow is embodied within a tube to react against a high drag body which largely but not completely fills the tube cross-section, both types of employment are economically practical. The power consumption per unit weight of pay load is low in either case due the basic arrangement. The vehicles derive their support directly from the tube by means of anti-friction means such as wheels and each vehicle is swept along the flowing mass of driving air. In our system, the static pressure is low so that the air flow may be generated by means of economical and conventional fans. The tube system itself is not required to withstand high internal pressures and so may be made very economically; and, as well, the vehicles may be very economically constructed since they need no provision for withstanding high pressures.

It now becomes apparent that the above described illustrated embodiments of the present invention are capable of obtaining the above stated objects and advantages. It is obvious that those skilled in the art may make modifications in the details of constructions without departing from the spirit of the invention which is to be limited only by the scope of the appended claims.

What is claimed is:

1. A vehicle transportation system comprising, in combination:

a tube system having a main section of substantially uniform cross-sectional shape and adapted to convey a vehicle axially therethrough, said tube system also including a first load-handling portion located at a first region of said section and a second load handling portion located at a second region of said main section, said first and second load handling portions being open to ambient atmosphere;

drive means for producing a continuously moving stream of air through said main section at a predetermined velocity and in a direction from said first region to said second region of said main section, said drive means including at least one air pumping device located between said first region and said second region, said air pumping device having an inlet and having an outlet discharging substantially axially toward said second region said drive means creating a negative pressure downstream of said first region and a positive pressure upstream of said second region but with the pressure at said load handling portions being at ambient atmospheric pressure while establishing air flow at said predetermined velocity; and a load carrying vehicle within said tube system, said vehicle having a body provided with antifriction means for supporting the vehicle within said main section, said body being shaped to provide a high coefficient of drag within said stream of air and having maximum cross-sectional shape only slightly smaller than said cross-sectional shape of the main section whereby the vehicle is swept along by the momentum of said stream of air while providing a clearance space with said main section sufficient to allow the stream of air to circulate continuously past said vehicle to said second region irrespective of velocity differentials which may exist between said vehicle and the air.

2. A vehicle transportation system comprising, in combination:

an endless tube system;

means for producing a continuously moving stream of air in one direction within said tube system at a predetermined mean velocity;

a vehicle of high drag coefficient within said tube system and only partially filling the cross-section thereof so as to be swept along by said stream of air;

said tube system having a main section of substantially uniform cross-sectional shape throughout adapted to convey said vehicle and said stream of air axially there through, said main section having vehicle loading handling portions at spaced points along the tube system and which are in open communication with ambient atmosphere, and bypass means associated with each load handling portion to allow maintenance of the flow of said stream of air through the tube system when a load handling portion contains a vehicle at rest;

said means comprising a series of air pumping devices withdrawing system air at spaced points along said tube system and reintroducing it substantially axially thereinto in said one direction adjacent to the withdrawal points; and said load-handling portions being disposed between adjacent points of air reintroduction, and said air pumping devices creating a negative pressure downstream of each load handling portion and a positive pressure upstream of each load handling portion but with the pressure at said load handling portions being substantially at ambient atmospheric pressure.

3. A vehicle transportation system comprising:

a tube of substantially uniform cross-sectional shape and free from obstructions so as to pass a vehicle of similar section freely and without impediment;

a vehicle within said tube, said vehicle having a body provided with antifriction means for supporting the vehicle within said tube, said body being shaped to provide a high coefficient of drag and having a cross-sectional shape only slightly smaller than said cross-sectional shape of the tube whereby the body is spaced from the tube by the antifriction means but presents a body of high drag characteristic within said tube;

drive means for maintaining a continuous movement of air through said tube at a predetermined mean velocity substantially at which it is desired to drive said vehicle, said drive means comprising a series of air pumping devices each withdrawing air from the system and reintroducing it generally axially into said tube in the direction of vehicle travel;

passage means for communicating said tube with ambient atmosphere between the points of air reintroduction of at least some of the adjacent pairs of air pumping devices;

a portion of said tube at said passage means accommodating the loading-unloading of said vehicle;

said drive means creating a negative pressure downstream of each said portion and a positive pressure upstream of each said portion but with the pressure being at ambient pressure at said loading-unloading portions; and means for allowing the driving air freely to by-pass said portions when a vehicle is stopped therein.

4. A vehicle transportation system comprising:

a tube of substantially uniform cross-sectional shape and smooth interior and free from obstructions so as to pass a vehicle of similar section freely and without impediment;

a vehicle within said tube, said vehicle having a body provided with antifriction means for supporting the vehicle within the tube and from the tube interior, said body being shaped to provide a high coefficient of drag and having a cross-sectional shape only slightly smaller than said cross-sectional shape of the tube whereby the body is spaced from the tube but presents a body of high drag characteristic within said tube;

drive means for maintaining a continuous movement of air through said tube at a predetermined mean velocity substantially at which it is desired to drive said vehicle, said drive means comprising at least one air pumping device withdrawing air from the system reintroducing it generally axially into said tube in the direction of vehicle travel;

said tube having vehicle loading-unloading portions which are in open communication with ambient atmosphere; and said drive means being positioned between said loading-unloading portions and operatively connected for creating in said tube a negative pressure upstream of said drive means and a positive pressure downstream of said drive means but with the pressure at said vehicle loading-unloading portions being at ambient atmospheric pressure.

5. A mass transit system comprising, in combination:

an endless tube of substantially uniform cross-sectional shape throughout and free from obstructions so as to pass a vehicle of similar section freely and without impediment;

a passenger vehicle within said tube, said vehicle having a body provided with means for supporting the vehicle within said tube, said body being shaped to provide a high coefficient of drag within said tube and having a cross-sectional shape only slightly smaller than said cross-sectional shape of the tube whereby the vehicle presents a body of high drag characteristic within said tube while allowing air to flow past the vehicle;

drive means for maintaining a continuous movement of air through said tube at a predetermined mean velocity substantially at which it is desired to drive said vehicle, said drive means comprising a series of air pumping devices each withdrawing air from the system and reintroducing it generally axially into said tube in the direction of vehicle travel;

passage means for communicating said tube with ambient atmosphere between the points of air reintroduction of at least some of the adjacent pairs of air pumping devices, and the points of air reintroduction being serially spaced throughout the length of the tube sufficiently close to obtain a pressure drop at the region of each withdrawal and reintroduction which is tolerable to humans;

a portion of said tube at least one of said passage means accommodating the loading and unloading of passengers;

and means for routing the driving air around said vehicle when said vehicle is at rest at said portion.

6. In a vehicle transportation system as defined in claim 1 wherein said drive means is operative to generate air flow in either direction therethrough.

7. In a cargo transport system, a tube having a substantially uniform cross-section for guiding a vehicle therein;

means for generating a high mass rate of flow of low pressure air within said tube in either direction therethrough, said means including a fan device having an air intake inducting a fractional part only of the flowing air and having an air outlet discharging air substantially axially within the tube;

a wheeled vehicle supported in said tube, said vehicle having a cross-section provided substantially but not completely filling the tuge cross-section thereby to be swept along by said high mass rate of flow of low pressure air while allowing air to flow therepast so as to maintain the flow of air within said tube regardless of the relative velocity of said vehicle with respect to the velocity of the air flow within said tube; and wherein each end of said tube is open to the atmosphere at both ends provided with an opening to ambient atmosphere and a dead-end section beyond each such opening.

8. An air driving device for use in conveying a high drag characteristic vehicle freely through a tube on anti-friction devices connected to the vehicle adjacent the bottom thereof between a loading portion and an unloading portion of the tube comprising:

said driving device including an unobstructed inlet, a pump, and a nozzle in series, all of which are positioned outside said tube for maintaining a movement of air axially within said tube;

said inlet being upstream from the nozzle and both said inlet and nozzle being connected to the tube adjacent only the top of the tube thereby avoiding interference with the antifriction devices on the vehicle;

said inlet and nozzle being positioned between said loading portion and said unloading portion of the tube; and said driving device being sized whereby the quantity of flow through the pump is less than half the flow in the tube 9. A vehicle transportation system comprising, a tube of substantially uniform cross-sectional shape and smooth interior and free from obstructions so as to pass a vehicle of similar section freely and without impediment;

a vehicle within said tube, said vehicle having a body provided with anti-friction means adjacent the bottom thereof for supporting the vehicle within the tube and from the tube interior, said body having a cross-sectional shape only slightly smaller than said cross-sectional shape of the tube whereby the body is spaced from the tube but presents a body of high drag characteristic within said tube;

said tube having vehicle loading and unloading portions which are in open communication with the ambient atmosphere;

drive means for maintaining a movement of air through said tube at a predetermined mean velocity substantially at which it is desired to drive said vehicle, said drive means including an inlet, a pump, and a nozzle in series, all of which are positioned outside said tube, said inlet being upstream from the nozzle and both said inlet and nozzle being connected to the tube adjacent only the top of the tube thereby avoiding interference with the anti-friction devices on the vehicle, said inlet and nozzle being positioned between a loading and an unloading portion of the tube, and said pumping device sized whereby the quantity of flow through the pumping device is a fraction of the quantity of flow through the tube.

10. A mass transit system for use in moving a load-carrying vehicle along a predetermined route between a number of load handling stations comprising, in combination:

a. a load-carrying vehicle;

b. transport tube means located along said predetermined route, said tube means detailed in design to provide a conveying means for said load-carrying vehicle;

c. at least two load handling stations operatively associated with said tube means at axially spaced locations for loading and unloading relative of said vehicle, each station including a vehicle-receiving section and an air by-pass section in which said sections are arranged to provide parallel branches of said tube means and wherein said vehicle-receiving section is open to ambient atmosphere;

d. drive means connected between said load handling stations for producing a high mass rate flow stream of low pressure air filling said tube means and flowing in the direction from one load handling station toward the other load handling station wherein the flow of air exhibits a negative pressure downstream of said one load handling station and a positive pressure upstream of said other load handling station and wherein each said load handling station is open to ambient atmosphere, and e. said load-carrying vehicle being of a shape to present a high coefficient of drag in said stream of air and having a cross-sectional shape allowing flow of said stream of air to be maintained within and through said tube means irrespective of the disposition and velocity of said vehicle in said stream.

11. The apparatus of claim 5 wherein the air pressure in the conduit is less than 1 psi.

12. A vehicle transportation system comprising, a conduit system having a main section of substantially uniform cross-sectional shape for conveying a vehicle axially therethrough, said conduit system including a loading portion located at a first region of said section and an unloading portion located at a second region of said main section, said loading and unloading portions being open to atmospheric pressure at both ends and including a dead-end section beyond each end, and said conduit system including air by-pass means arranged in parallel with each said loading portion and said unloading portion, drive means for continuously producing a flow of air within said system for moving a vehicle through said system, said drive means including a booster pump between the loading and the unloading portions to maintain a negative pressure downstream of the loading station to said booster pump and a positive pressure from said booster pump to the unloading station, a load carrying vehicle within said system, said vehicle having a body provided with antifriction means for supporting the vehicle within said main section, said body being shaped to present a high coefficient of drag in said flow of air and having a maximum cross-sectional shape smaller than said main section whereby the vehicle is swept along by the momentum of said air while providing a clearance space between the interior of the conduit system and the vehicle to allow the air continuously to flow within said system.

13. A mass transit system in accordance with claim 5 wherein said air pumping devices each have an inlet communicating with said tube and jet outlet means discharging generally axially into said tube in the direction of vehicle travel, the inlet and jet outlet means of each air pumping device being disposed in close adjacency.

14. A vehicle transportation system in accordance with claim 1 wherein said air pumping device has an air intake inducting a fractional part only of the flowing air and having an air outlet discharging air substantially axially within the tube.

15. A vehicle transportation system in accordance with claim 2 wherein said means for producing a continuously moving stream of air includes a fan device having an air intake inducting a fractional part only of the flowing air and having an air outlet discharging air substantially axially within the tube.

16. A vehicle transportation system in accordance with claim 1 including means for diverting a portion of said air flow past each load handling portion whereby air may flow continuously through the main section while a vehicle is positioned at said load handling portion.

* * * * *

UNITED STATES PATENT OFFICE
CERTIFICATE OF CORRECTION

Patent No. 3,797,465          Dated March 19, 1974

Inventor(s) Marion R. Carstens and Homer J. Bates

It is certified that error appears in the above-identified patent and that said Letters Patent are hereby corrected as shown below:

Column 1, line 41, change "is" to --in--.

Column 2, line 9, change "must" to --much--.

Column 9, line 54, change "loading" to --load--.

Column 11, line 54, change "tuge" to --tube--.

Signed and sealed this 10th day of September 1974.

(SEAL)
Attest:

McCOY M. GIBSON, JR.          C. MARSHALL DANN
Attesting Officer             Commissioner of Patents